United States Patent [19]
Erb

[11] 3,986,354
[45] Oct. 19, 1976

[54] METHOD AND APPARATUS FOR RECOVERING LOW-TEMPERATURE INDUSTRIAL AND SOLAR WASTE HEAT ENERGY PREVIOUSLY DISSIPATED TO AMBIENT

[76] Inventor: George H. Erb, Rte. 103, Cuttingsville, Vt. 05738

[22] Filed: Sept. 15, 1975

[21] Appl. No.: 613,304

[52] U.S. Cl. .................................. 60/325; 60/527; 60/528; 60/413; 417/321; 417/379
[51] Int. Cl.² ........................................ F16D 31/02
[58] Field of Search .............. 417/321, 379; 60/325, 60/527, 528, 413

[56] References Cited
UNITED STATES PATENTS

| | | | |
|---|---|---|---|
| 2,884,866 | 5/1959 | Patterson | 417/379 |
| 3,099,222 | 7/1963 | Poliseo | 417/379 |
| 3,259,070 | 5/1966 | McKenzie | 417/379 |
| 3,291,054 | 12/1966 | McKenzie | 417/379 X |
| 3,937,019 | 2/1976 | Renner | 60/527 |

FOREIGN PATENTS OR APPLICATIONS

| | | | |
|---|---|---|---|
| 229,211 | 2/1925 | United Kingdom | 60/398 |

*Primary Examiner*—Allen M. Ostrager
*Attorney, Agent, or Firm*—Parmelee, Johnson & Bollinger

[57] ABSTRACT

A method and apparatus are described for recovering useful amounts of low-temperature industrial and solar waste heat energy previously dissipated to ambient. The low-temperature heat energy is used cyclically for heating and expanding thermally expandable wall means shown as a cylindrical walled structure located between two pumping chambers for simultaneously changing the volumes of the chambers in opposite senses, then a cold sink is used cyclically for cooling and contracting said cylindrical walled structure for again simultaneously changing the volumes of both chambers in the opposite senses, i.e. in push-pull relationships. The cyclic change in volumes of the chambers displaces an incompressible fluid which is used for pumping a liquid from a reservoir for performing useful work, and, in one form of the invention, the liquid is directed into an accumulator under pressure, and the pressurized liquid in the accumulator may thereafter be utilized to perform useful work. A heat transfer fluid medium is used in one portion of the cycle to transfer heat energy from the energy source to heat and expand the cylindrical walled structure, and in another portion of the cycle to absorb heat energy from this walled structure to cool and contract it. This heat transfer fluid medium is shown as being compartmentalized into a number of small insulated volumes thereof which progressively serve to heat and cool the expandable wall means of the pumping chambers while minimizing loss of heat energy. For minimizing thermal losses, hydraulic transformers may be included isolating the incompressible fluid (being pulsated by the pumping chambers) from the pressurized liquid. This incompressible pulsating fluid may be a de-gassed liquid or a soft elastomer.

30 Claims, 14 Drawing Figures

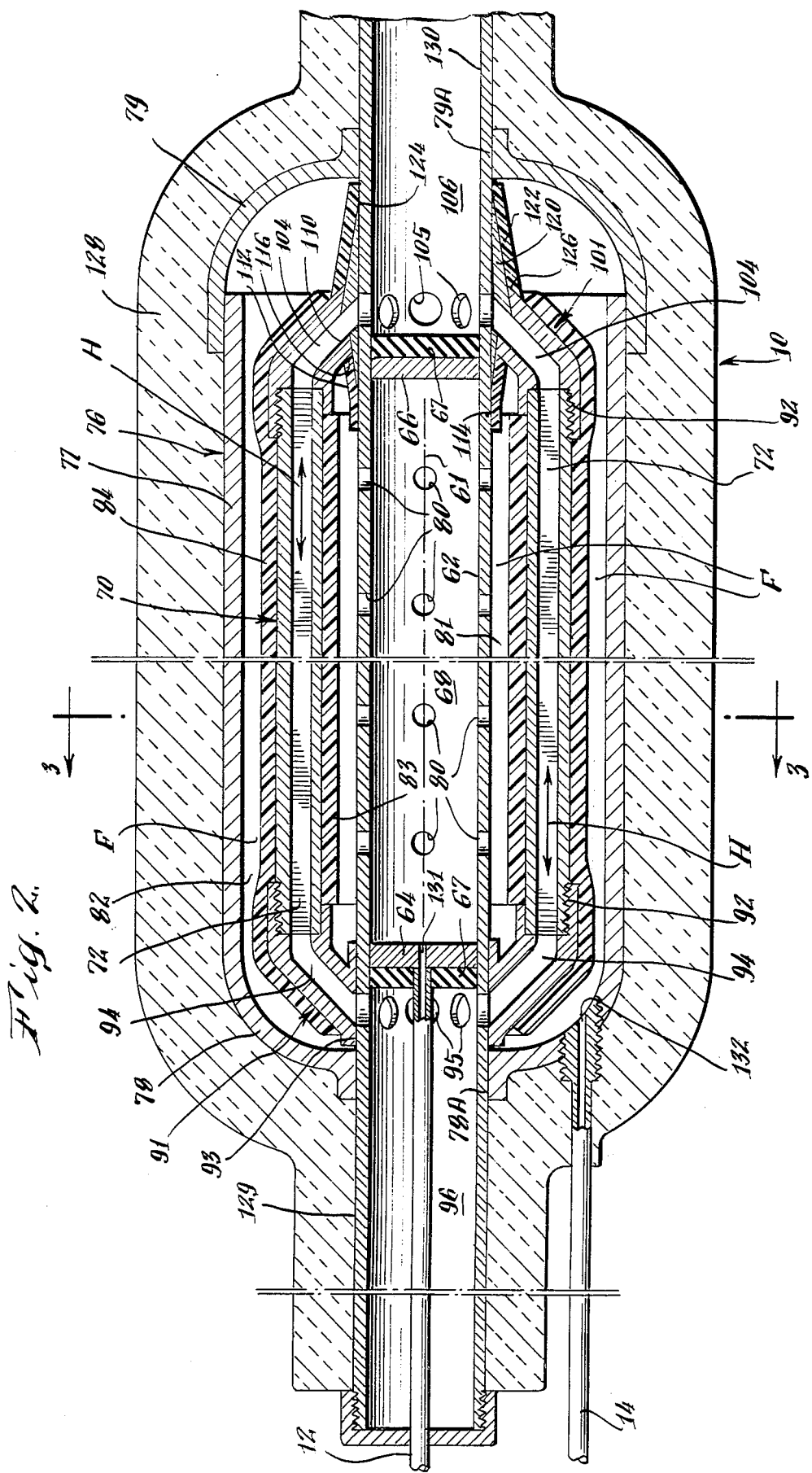

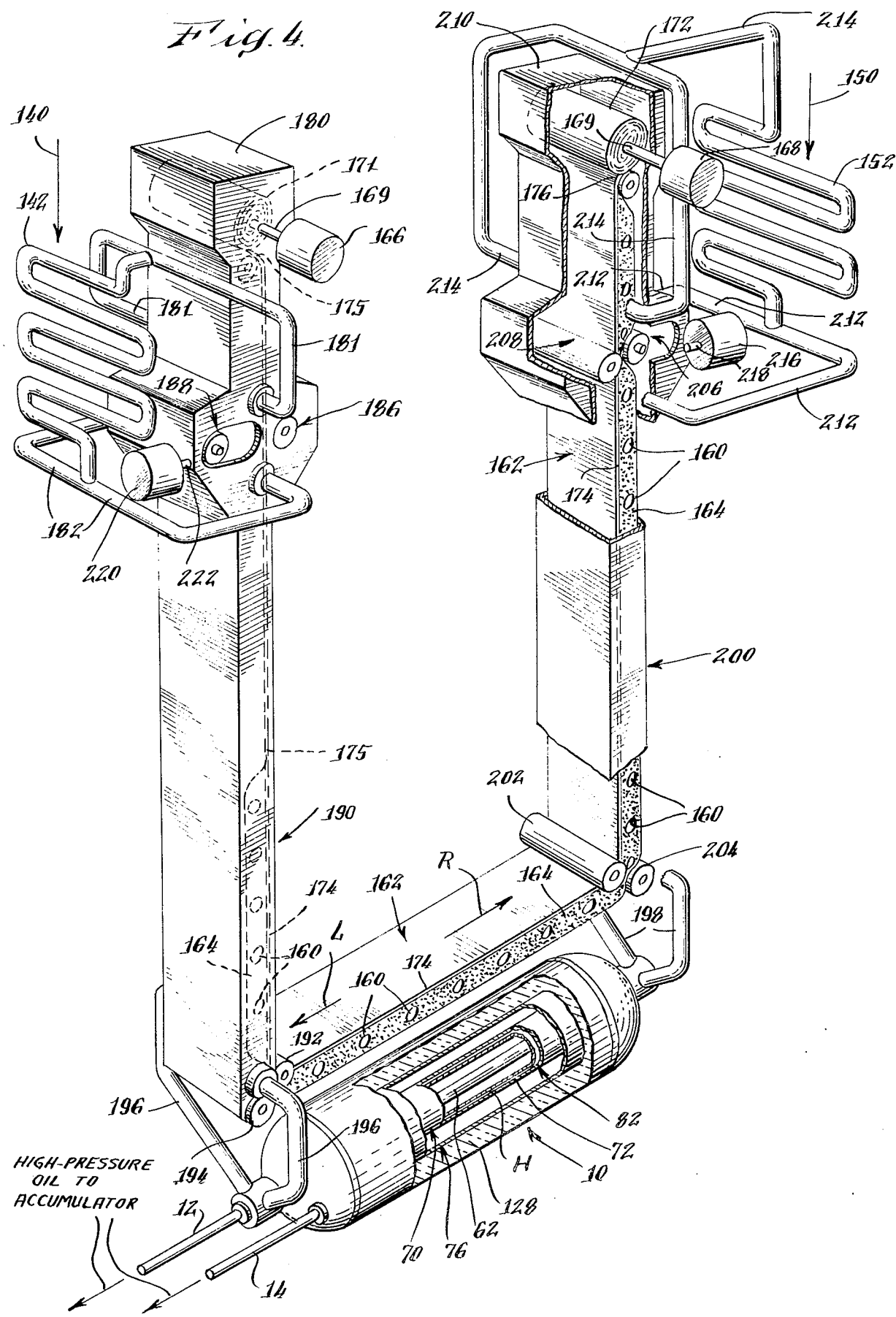

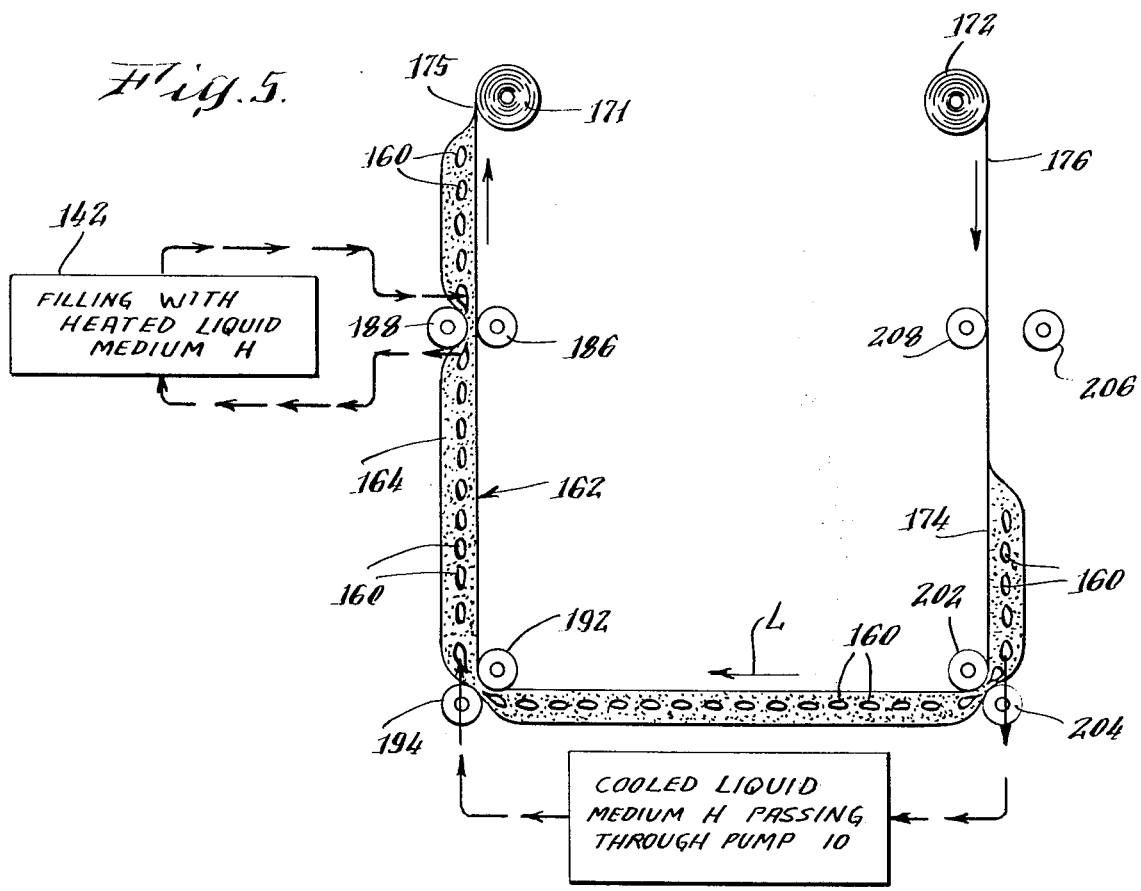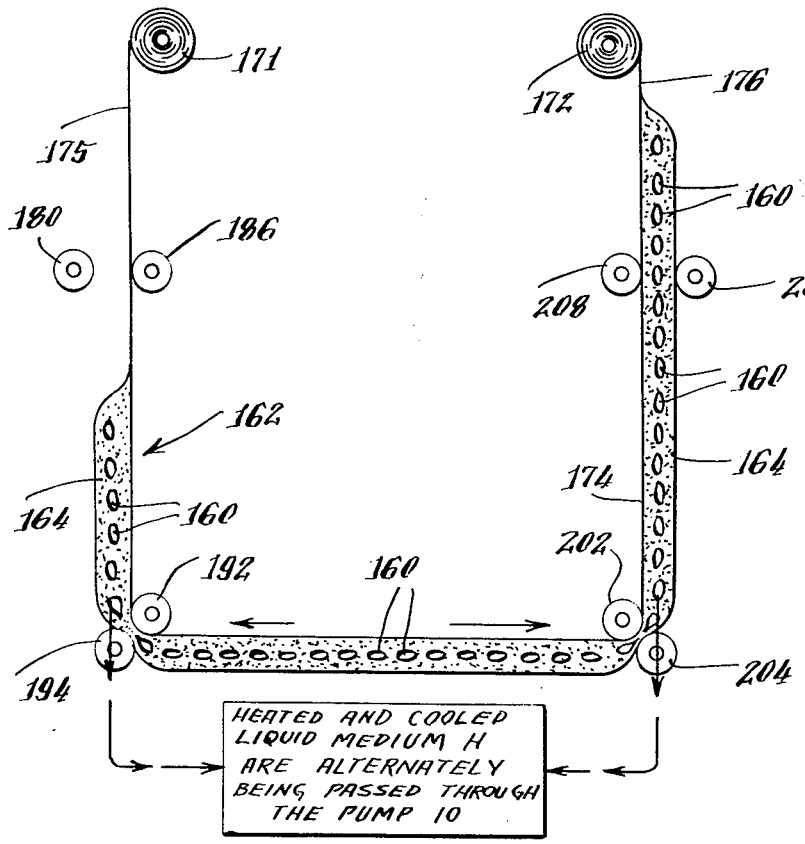

METHOD AND APPARATUS FOR RECOVERING LOW-TEMPERATURE INDUSTRIAL AND SOLAR WASTE HEAT ENERGY PREVIOUSLY DISSIPATED TO AMBIENT

BACKGROUND OF THE INVENTION

In industrialized countries, such as in the United States, there are vast quantities of low-temperature heat energy which are dissipated uselessly into the environment. This low-temperature heat energy is contained in gases and liquids which are discharged from industrial plants at temperature levels currently considered to be too low to be economically utilized.

Also, throughout many geographic areas of the world, a radiation absorbent heat exchanger such as one having a dull black surface and which is insulated against heat loss, can be heated up to temperatures of 250° F or more by solar radiation. Although such solar radiation-heated heat exchangers are currently being utilized for purposes of heating buildings, houses and other inhabited spaces, they are not currently used very much for recovery of solar energy in a form suitable for performing useful mechanical work, for example such as to generate electrical power or to drive machinery. Thus, much of the incident solar energy in these areas of the world is currently allowed to become dissipated to the environment as waste heat energy.

The present invention provides method and apparatus for recovering such low-temperature industrial and solar heat energy and any other waste heat energy which is now being dissipated to ambient.

SUMMARY OF THE INVENTION

As used herein, the term "low-temperature heat energy source" is intended to mean a source of heat energy at a temperature which is so low that it is currently considered to be too low to be economically utilized, for example at 212° F. The term "waste heat energy" is intended to mean any collectible source of heat energy which is currently permitted to become dissipated to ambient because it is considered uneconomical for recovery.

A method and apparatus are described for recovering low-temperature industrial and solar heat energy and any other waste heat energy previously dissipated to ambient. This heat energy is used for cyclically heating and expanding thermally expandable wall means located between two pumping chambers for simultaneously changing the volumes of the chambers in opposite senses, then a cold sink is used for cyclically cooling and contracting this wall means for again simultaneously changing the volumes of both chambers in the opposite senses. The expansion/contraction wall means is shown as a cylindrical walled structure positioned intermediate the two pumping chambers.

The resultant cyclic change in volumes of the chambers displaces an incompressible fluid, which may be a de-gassed liquid or a soft elastomer, and which is used for pumping a liquid from a reservoir for performing useful work. The liquid may be pumped into an accumulator to be stored therein under pressure. This pressurized liquid in the accumulator is thereafter utilized to perform useful work, such as for generating electrical power. A heat transfer medium is used in one portion of the cycle to transfer heat energy from the low-temperature or waste heat energy source for heating the expansion/contraction wall means. The heat transfer medium is also used in another portion of the cycle for absorbing heat energy from this expansion/contraction wall means for cooling it.

In order to minimize losses of heat energy, this heat transfer medium is shown as a liquid which is compartmentalized into small insulated volumes thereof which progressively serve to heat and then progressively to cool the expansion/contraction wall means of the pumping chambers in repeated cycles of operation.

In order to minimize thermal losses or undesired circulation within the incompressible fluid which is being pulsated by the pumping chambers, hydraulic transformers are included that isolate this incompressible fluid from the pressurized liquid being pumped.

BRIEF DESCRIPTION OF THE DRAWINGS

The various features, aspects and advantages of the method and apparatus of the present invention will be more fully understood from a consideration of the accompanying drawings, in conjunction with the following detailed description.

In these drawings:

FIG. 2 is a longitudinal axial section of a thermal expansion/contraction pump, taken along the plane 2—2 in FIG. 3;

FIG. 4 is a perspective view illustrating the recovery of low-temperature heat energy for energizing the system;

FIGS. 5, 6 and 7 are diagrams of the system of FIG. 4 showing different operating positions of the apparatus for purposes of illustration and explanation;

DETAILED DESCRIPTION

Figure 1:
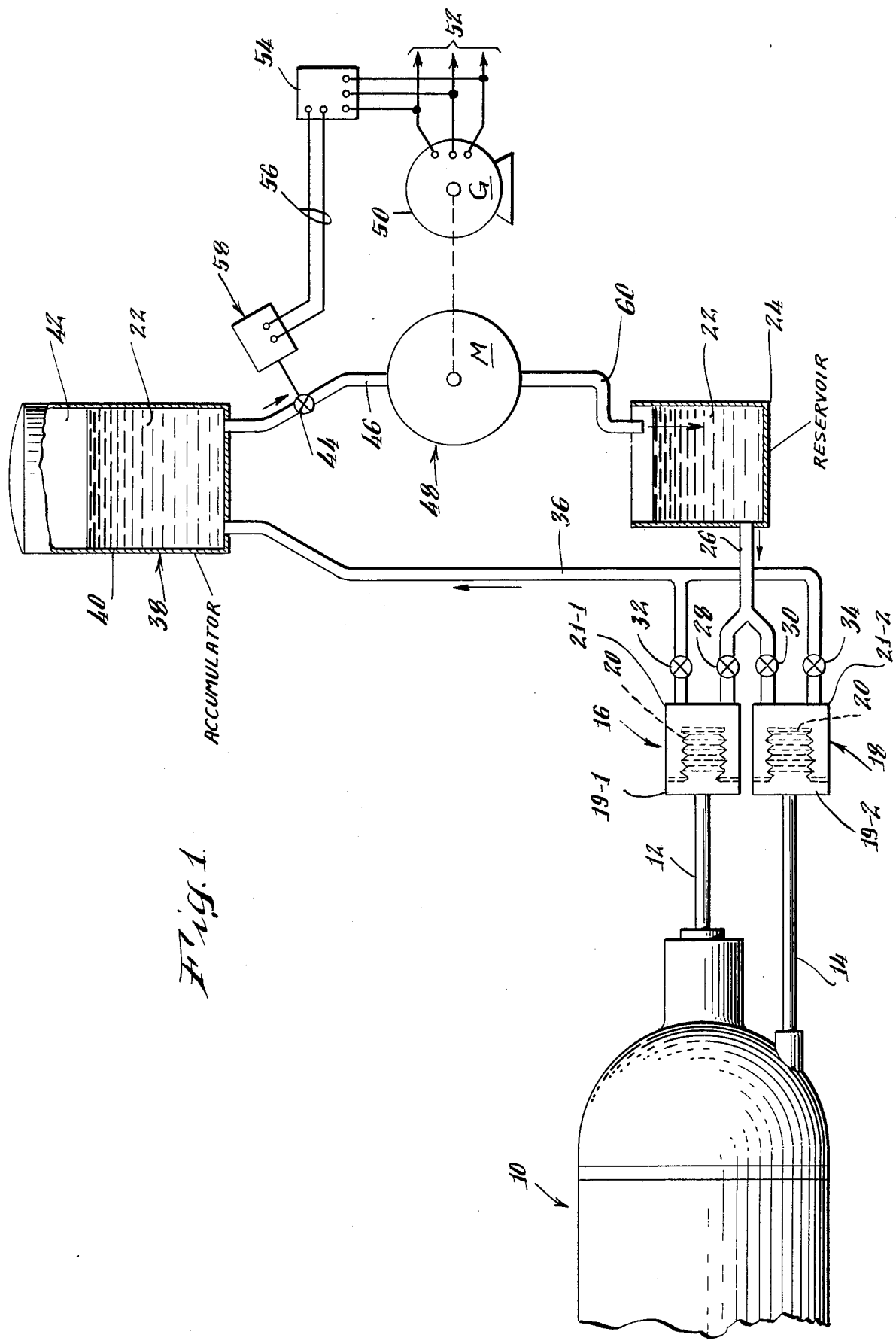
FIG. 1 is a schematic circuit diagram of an electrical power generation system employing the method and apparatus of the present invention.

As shown in FIG. 1, the thermally-actuated, expansion/-contraction pump 10 is connected through high pressure pipe lines 12 and 14 to a pair of hydraulic transformers 16 and 18. These hydraulic transformers each includes a rigid container with separator means 20 in the form of a movable bellows or slack membrane within the container for separating the interior into two separate chambers 19 and 21. The chambers 19 and 21 are called the primary chambers and secondary chambers, respectively. The movable bellows or slack membrane 20 is very compliant so that it can freely move back and forth for maintaining equal pressure within the primary and secondary chambers 19 and 21.

A liquid 22 is held in a reservoir 24. This liquid 22 may be any suitable liquid for operating an hydraulic motor, for example such as hydraulic oil or a water-base liquid containing a rust inhibitor plus a permanent-type anti-freeze such as ethylene-glycol, plus a lubricant. I prefer to utilize hydraulic oil as the liquid 22 because it has a lower specific heat than a water-based liquid and thus causes less thermal loss.

The reservoir 24 is connected through a supply line 26 which branches and feeds through a pair of check valves 28 and 30 into the respective secondary chambers 21-1 and 21-2 in the hydraulic transformers 16 and 18. These check valves 28 and 30 permit the liquid 22 to flow from the reservoir 24 into these secondary chambers 21, while preventing reverse flow of this liquid from these secondary chambers back into the reservoir.

As will be explained in detail further below, the thermally-actuated, expansion/contraction pump 10 is subjected to changes in temperature which produce advantageous pumping actions such that an incompressible fluid F (FIGS. 2 and 3) is alternately forced under pressure through the lines 12 and 14 into the primary chambers 19-1 and 19-2 of the respective hydraulic transformers 16 and 18. The incompressible fluid F which is pulsated by the pump 10 is preferred to be of a low specific heat as compared with water. For example, this fluid may be an hydraulic oil identical to the hydraulic oil 22, or it may be a displaceable semi-solid such as a soft elastomer. It is desirable that any liquid which is used as the incompressible fluid be de-gassed.

When this fluid F is being forced by the pump 10 under pressure through the line 12 into the primary chamber 19-1, an amount of this fluid is simultaneously being retracted through line 14 from the other primary chamber 19-2 into the pump 10, and vice versa. The pressurized flow of the flulid F into the primary chamber 19-1 increases the volume of this primary chamber by causing the compliant separator means 20 to move toward the right, thereby correspondingly decreasing the volume of the secondary chamber 21-1. Conversely, the retraction of fluid F from the other primary chamber 19-2 causes the other secondary chamber 21-2 to become increased in volume, and vice versa. Thus, a forceful pumping action is produced as the incompressible fluid F is cyclically forced into the primary chamber 19-1 and then into the other primary chamber 19-2, and so forth, producing cyclic decreases and increases in the volume of the secondary chambers 21-1 and 21-2.

This pumping action alternately draws the liquid 22 from the reservoir 24 through the check valves 28 and 30 into the secondary chambers 21-1 and 21-2 and then forces this liquid under pressure through the respective outlet check valves 32 and 34 and through a high-pressure feed line 36 leading into an accumulator 38. The check valves 32 and 34 permit liquid flow from the secondary chambers 21-1 and 21-2 into the accumulator while preventing reverse flow from the accumulator back into these secondary chambers.

The accumulator 38 includes a rigid tank 40 capable of withstanding a great pressure and has a suitable gaseous medium 42 trapped in the upper portion of the tank 40 above the liquid 22 within the lower portion. The gaseous medium 42 may be any suitable gas which is compatible with the liquid 22 even under great pressure. For example, the gaseous medium 42 may be air or nitrogen.

As the thermally-actuated pump 10 causes the liquid 22 to be pumped into the accumulator 38, the gaseous medium 42 becomes progressively more compressed producing a progressive increase in the pressure of the liquid 22 in the accumulator. This highly pressurized liquid in the accumulator 38 is capable of performing useful mechanical work. Therefore, it is to be understood that the accumulator 38 provides a storable source of energy which can be conveniently stored for a long time before usage, if desired.

The high pressure feed line 36 may be connected directly to a work load 48, such as to an hydraulic motor M, if desired, and particularly such a direct connection can be made where there is no need for storage of energy.

When it is desired to utilize energy stored in the accumulator 38, a control valve 44 is opened allowing the pressurized liquid to flow through a line 46 to the work load 48, which is shown driving an electrical generator or alternator 50. The electrical energy produced by the generator or alternator 50 is fed out through the electrical output lines 52. If it is desired to automatically control the valve 44, an electronic controller 54 may be connected to the output lines 52. This controller 54 is responsive to the current and voltage conditions in the lines 52 and is connected through a circuit 56 to a valve operator 58 which is mechanically coupled to operate the valve 44.

After the pressurized liquid has passed through work load 48, its pressure has become reduced, and it is returned to the reservoir 24 through a pipe line 60.

Figure 1A:
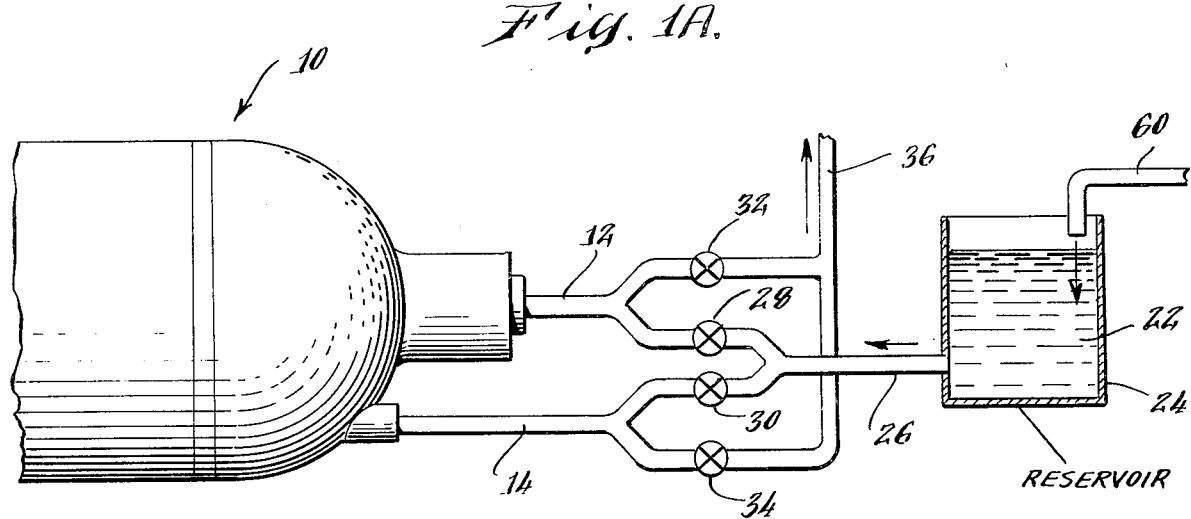
FIG. 1A shows a modified arrangement of a portion of the circuit of FIG. 1.

As shown in FIG. 1A, the hydraulic transformers 16 and 18 may be omitted, if desired. They serve to isolate the incompressible fluid F in high-pressure pipe lines 12 and 14 which is being pulsated by the pump 10 from the liquid 22 which is passed through the work load 48. When the hydraulic transformers are omitted, the pump lines 12 and 14 are directly connected through the check valves 28 and 32, 30 and 34 to the reservoir and to the accumulator.

Alternatively, as discussed above, the high pressure line 36 in FIG. 1A may be connected directly to a work load 48, for example, such as the hydraulic motor M. This arrangement of omitting the hydraulic transformers 16 and 18 simplifies the system somewhat; however, inclusion of the hydraulic transformers, as shown in FIG. 1, is preferred in most cases since it thermally isolates the fluid F which is caused to pulsate within the pump 10 from the remainder of the system. Also, where this pump fluid F (FIG. 2) is a de-gassed liquid, the hydraulic transformers isolate it from the hydraulic liquid 22 which is circulating in the remainder of the system.

Figure 3:
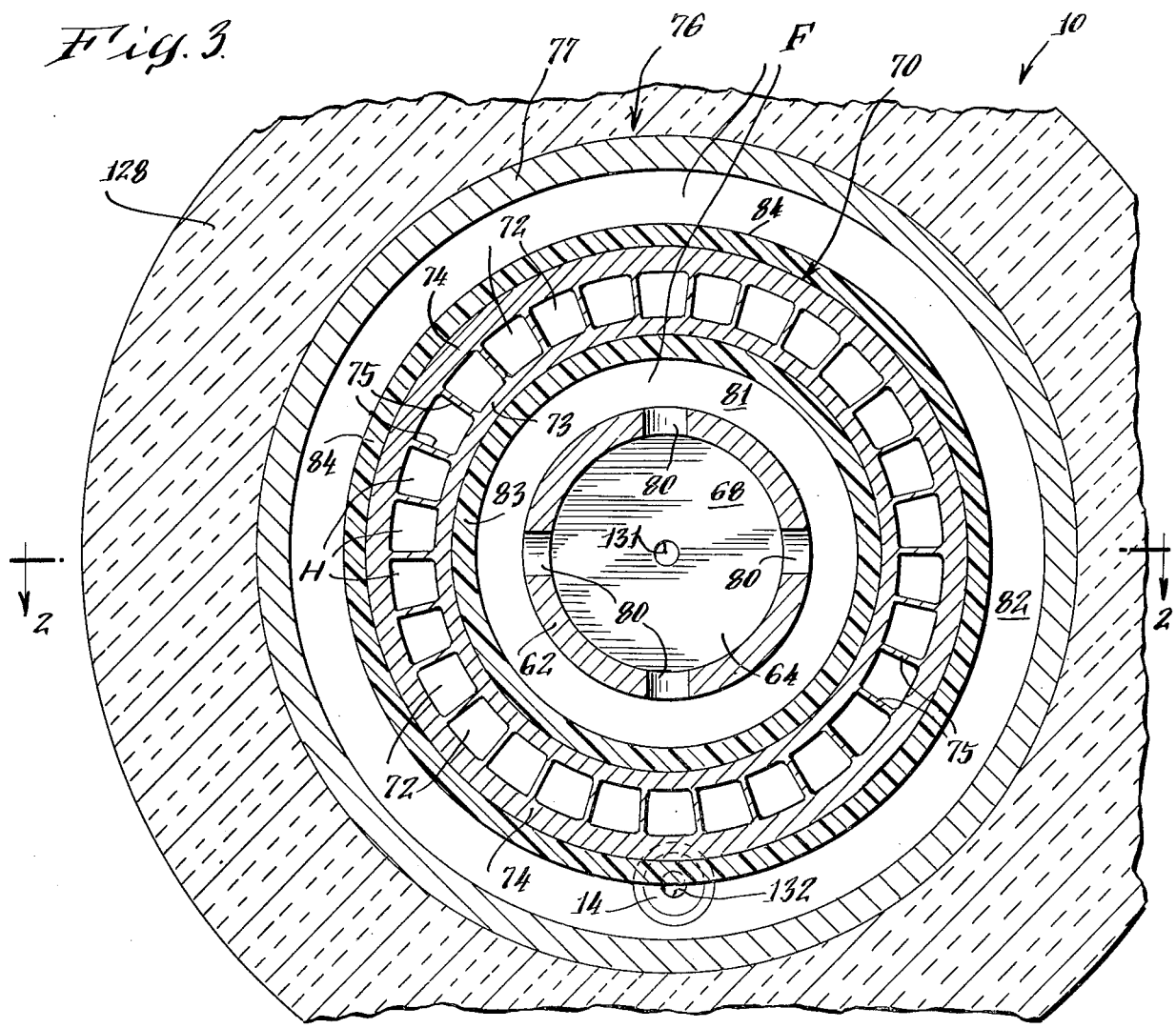
FIG. 3 is a cross section of the thermal expansion/contraction pump taken along the plane 3—3 in FIG. 2.

As shown in FIGS. 2 and 3, the thermally-actuated, expansion/contraction pump 10 includes an inner rigid hollow cylindrical member 62 concentric about an axis 61. This member 61 is shown as a thick-walled steel pipe. There is a pair of spaced rigid barrier plugs 64 and 66 which block off this inner cylindrical member at two axially spaced locations to define an axial chamber 68 within the pipe 62. A layer of thermal insulation 67 is positioned against the outer side of each of these barrier plugs 64 and 66.

Concentric to the inner hollow cylindrical member 62 is a thermally-expandable wall means 70 formed from a strong material of good heat conductivity and which expands when heated over any portion of the temperature range over which the pump 10 is intended to be operated. For example, in some applications this range extends from −50° up to 250° F. Preferably, this material has a relatively large coefficient of thermal expansion over this range and preferably has a relatively low specific heat, as compared with water. Also, it is preferred that the material forming the cylindrical wall means 70 have approximately the same yield strength in tension as it does in compression.

I have found that aluminum is a preferred material for forming the thermally-expandable cylindrical wall means 70. Moreover, by utilizing aluminum, this wall means 70 can be fabricated by extrusion.

As seen in FIG. 3, the wall means 70 is a hardened tubular aluminum extrusion arranged to have a heated and cooled liquid passed in good heat exchange relationship with itself. In order to provide for this heat exchange relationship, the wall means 70 is formed as a cylindrical walled structure including a plurality of passages 72 extending longitudinally therethrough parallel with the axis 61, thus forming an inner wall 73 and an outer wall 74. These inner and outer walls 73 and 74 are interconnected as an integral walled structure 70 by a plurality of radially extending webs 75, bridging across between them.

Surrounding the expansion-contraction wall means 70, and spaced therefrom concentric about axis 61, is a rigid housing 76 formed by a thick-walled steel shell 77 having an end bell 78 integral therewith at one end. Another end bell 79 is fixed to the opposite end of the shell 77 to complete the rigid housing 76. This housing 76 may be pre-stressed to resist internal pressure, and the end bells 78 and 79 are secured at 78A and 79A to the hollow inner member 62, so that the housing 76 is tight against any leakage of high pressure liquid.

An inner pumping chamber 81 is located within the inner wall 73. This inner pumping chamber communicates with and includes the axial chamber 68. There are multiple openings 80 in the inner heavy-walled member 62. An outer pumping chamber 82 is located outside of the outer wall 74, this outer chamber being enclosed by the pre-stressed housing 76.

In order to minimize heat loss from the expansion/contraction wall means 70, there are inner and outer thermal insulation layers 83 and 84, for example, of elastomeric insulation material, such as polyurethane, shown adhered to the inner and outer walls 73 and 74.

An end closure or cap 91 is screwed at 92 onto the externally threaded end of the expansion/contraction wall means 70. This end closure 91 is made of material having the same coefficient of thermal expansion as the wall means 70 and is secured at 93 to the hollow inner member 62. The end closure 91 has a plurality of passages 94 communicating with the axially extending heat exchange passages 72 in the wall means 70. These latter passages 94 communicate through a circle of ports 95 with a first inlet/outlet duct 96 provided by the interior of the hollow member 62 outside of the barrier plug 64.

Another end closure or cap 101 is screwed at 92 onto the externally threaded end of the wall means 70. The end closure 101 is formed of the same material as the closure 91 and has a plurality of passages 104 therein communicating with the heat-exchange passages 72. The inner ends of the passages 104 communicate through another circle of ports 105 with a second inlet/outlet duct 106 provided by the interior of the hollow member 62 outside of the other barrier plug 66.

In order to allow for both axial and radial expansion and contraction of the cylindrical wall means 70 and its end caps 91 and 101, the latter end cap is allowed to move relative to the inner hollow member 62. The cap 101 has an inner scraper element 110 which encircles the inner hollow member 62 in sliding engagement therewith. This scraper element 110 tapers inwardly and has its lip in sliding contact with the inner hollow member 62. A flexible elastomeric boot 112, for example of polyurethane, is secured at 114 to the inner member and is secured at 116 to the end cap 101.

Similarly, there is an outer tapered scraper 120 having its lip in sliding contact with the inner hollow member 62. Another flexible elastomeric boot 122 is fastened at 124 to the inner hollow member 62 and at 126 to the end cap 101.

A heavy layer of insulation 128 surrounds the rigid housing 76 and the two end portions 129 and 130 of the member 62 which define the inlet/outlet ducts 96 and 106.

In operation, a heated liquid serving as a heat transfer medium H is circulated into the duct 96 and through the passageways 94, 72 and 104, and out through the duct 106. Thus, the wall means 70 become heated and expand axially and radially. The volume of the outer pump chamber 82 is reduced, and so some of the incompressible fluid F therein is forced under pressure out through the high-pressure line 14. Conversely, the volume of the inner pump chamber 81, 68 is incresed by the axial and radial expansion of the wall means 70, and so some fluid F is retracted in through the line 12 into this inner chamber.

In the next step in the operation, a cooler liquid heat transfer medium H is reverse-circulated in through the duct 106, through the passages 104, 72 and 94 and out through the duct 96. In this way, the wall means 70 become cooled and contract axially and radially. The volume of the outer pump chamber 82 becomes increased while the volume of the inner pump chamber 81, 68 becomes decreased. Thus, some of the incompressible fluid F is now forced under pressure out through the high pressure line 12, while some fluid F is drawn in through the line 14 into the outer pump chamber 82. The steps of heating and cooling the expansion/contraction wall means 70 are cyclically repeated to provide the pumping action described above.

The integral cylindrical walled structure 70 effectively serves to provide one wall (the outer wall of the pumping chamber 68, 81) and also to provide one wall (the inner wall) of the outer pumping chamber 82. Accordingly, the inner wall 73 serves to pump the fluid F during contraction of the integral wall means 70 while the outer wall 74 serves to pump fluid F during expansion. A push-pull pumping action is occurring simultaneously in two chambers. Thus, a major stress in the inner wall 73 is tension hoop stress while conversely a major stress in the outer wall 74 is compression hoop stress.

It is to be noted that the outer wall 74 is somewhat thicker than the inner wall 73. The reason for the additional thickness is to provide additional strength to withstand the greater hoop stress which occurs in the outer one of these two walls in view of the fact that the outer one has a greater circumferential extent and accordingly has a correspondingly greater area subjected to pressure of the incompressible fluid F being pumped.

The high pressure pump line 12 is connected to a port 131 in the barrier 64 and the high pressure pump line 14 is connected to a port 132 formed in the end bell 78. These lines 12 and 14 are preferably of small diameter so as to minimize the volume of the fluid F being pulsated so as to minimize hysteresis losses due to any slight compressibility of the fluid F as it undergoes cyclic pressurization and release of pressure.

An important desired characteristic of the insulation layers 83 and 84 is non-compressibility. These insulation layers 83 and 84 may be formed of rubber, polyurethane or any other durable non-compressible elastomeric material. These insulation layers 83 and 84 can also be formed by thin loose-fitting annular bags of elastomeric material packed with extremely fine glass wool and de-gassed hydraulic oil. The reason that the insulation layers 83 and 84 are to be as non-compressible as possible is to minimize hysteresis losses occurring during cyclic pressurization and release of pressure of the incompressible fluid F, such as de-gassed hydraulic oil being pumped.

The incompressible fluid F which is being pulsated out and in through the pump ports 131 and 132 may comprise a soft incompressible elastomeric material which completely fills the inner and outer pumping chambers 68, 81 and 82. That is, the elastomeric insulation material 83 and 84 may completely fill the respective pumping chambers. Then, the expansion and contraction of wall means 70 displaces this elastomeric fluid material in a rhythmic pumping action which serves in turn to pump the liquid 22. When such soft elastomeric material is used as the displaceable fluid F, the hydraulic transformers 16 and 18 may be omitted, for the elastomeric fluid material itself interfaces directly with the liquid 22 being pumped.

In the above operation, the heated liquid heat transfer medium H is described as entering the duct 96 and the cooler liquid heat transfer medium H as entering the duct 106. It is to be understood that the construction and operation of the pump 10 is such that the heated liquid H and the cooler liquid H may enter either end, i.e. may enter either duct 96 or 106 depending upon the piping layout of the system. It is preferred that the cooler liquid enter the pump 10 from the opposite end to that through which the hotter liquid enters, i.e. that the heated and cooled heat transfer liquid medium H is reverse-circulated through the passages 72 in the wall means 70.

As an illustrative embodiment of this thermally-actuated pump 10, the cylindrical wall means 70 is formed of a tube of aluminum 10 feet long. This aluminum is a hard alloy material, for example such as 17-S-T aluminum, having a diameter of 10 inches. The thermal-cycling of such aluminum alloy over a temperature range of 100° F produces an axial expansion of 0.137 of an inch with a resultant decrease in volume of the outer chamber 182 of approximately 32 cubic inches. The expansion/contraction aluminum wall means 70 may be operated up to a stress of 15,000 p.s.i., which is approximately one-half of the yield strength of this particular alloy material, without causing undue reduction in the useful life of the wall means 70.

In one mode of operating the thermally-actuated pump 10, a waste heat source 140 (FIG. 4), such as hot waste gases or liquids from an industrial plant or solar heat energy provided by incident solar radiation, is used to heat a heat transfer fluid medium H, for example water, passed through a heat exchanger 142. This water would contain a permanent-type anti-freeze, for example such as ethylene glycol, plus a lubricant which is compatible with the elastomeric boots 112 and 122 (FIG. 2). The heated medium H may be passed into either the duct 96 or 106 of the pump 10, as discussed above.

A suitable cold sink 150, for example, such as provided by cool ambient air or by a body of water, such as a lake, stream, river, or the ocean, is used to cool a second heat exchanger 152. The heat transfer medium H is circulated through the exchanger 152 to be cooled.

After the heated medium H has passed through the pump 10, to heat and expand the expansion/contraction wall means 70, then the cooled medium H is passed through this pump to cool and contract the wall means 70. This cooled medium H may be passed into either the duct 96 or 106, but it is preferred that this cooled heat transfer medium enter the opposite end of the pump 10 from that through which the heated medium entered.

In order to reduce thermal losses in passing the heated and cooled heat transfer fluid medium H, such as water, cyclically through the pump 10, a system, as shown in FIG. 4, may be utilized. This reduction of heat loss is accomplished by carrying the medium H in completely separate small volumes or compartments 160. Each of these incremental volumes 160 is shown in this embodiment as being defined by a tubular passage 160 open at both ends extending transversely through an insulated belt 162 of foamed polyurethane material 164. Accordingly, each of the transverse tubular passages 160 is thermally insulated by foamed polyurethane material 164 from its neighbor. This belt 162 is reciprocated back and forth by means of a pair of drive motors 166 and 168 connected by rotatable shafts 169 to reels 171 and 172.

In effect, this insulated belt in carrying the multiple small volumes of the heat transfer medium H is serving as a heat transfer belt.

This foamed insulation material 164 may be secured to a carrier or backing strip 174, for example such as a glass fabric strip or a strip of flexible film or sheet material such as Mylar. The tail ends 175 and 176 of this backing strip 174 act as leaders for attachment to the respective reels 171 and 172, so that the insulated belt 162 can be pulled back and forth by winding on the reels. Either motor 166 or 168 is operated for turning the reel 171 or 172 to wind up the backing strip at the end toward which the insulated heat transfer belt is to be advanced. A corresponding unwinding of the other end of the belt occurs at the other reel. These motors 166 and 168 may be liquid-driven motors, for example such as a "Gerotor" motor-pump unit which can be obtained commercially from Nichols Engineering Company, located at 48 Woerd Avenue, Waltham, Massachusetts 02154.

The reel 171 is positioned within a closed end region 180 of an elongated channel 190 in the form of a tunnel to be described in detail further below, and the heat exchanger 142 is connected by a supply line 181 branching into opposite sides of this enclosed region 180. A pair of return lines 182 also connect lower points on opposite sides of this enclosed region 180 with the heat exchanger 142. When the insulated belt 162 is being driven to the left (as indicated by the arrow L, in FIG. 4), the heated medium H, such as water, from the coil 142 passes through the line 181 and enters and fills the tubular passages 160 of the insulated belt located in the channel 190.

This filling of the tubular passages 160 occurs as the bare leader end 175 of the insulated belt 162 reels onto the reel 171. These tubular passages 160 are fully collapsed as they pass between controllable squeeze rollers 186 and 188. Consequently, as the collapsed tubular passages 160 emerge above these squeeze rollers they return to their normal shape and become filled with the heated transfer medium H.

These squeeze rollers 186 and 188 are a pair of opposed rollers located in the tunnel 190 near the bottom of the enclosed region 180. These squeeze rollers 186 and 188 are held in their spaced-apart (inactive) positions, as shown in FIG. 4, when it is not desired to circulate the heat transfer medium H through the heat exchanger 142. The two branches of the supply line 181 communicate with the space in the enclosure 180 located just above the nip of the rollers 186 and 188. Conversely, the two branches 182 of the return line communicate with the space just below the nip of these rollers.

The heated medium H, such as water, is maintained in the tubular passages 160 by the tunnel member or channel 190 communicating with and extending from the lower end of the enclosed region 180. This tunnel 190 completely encircles the insulated belt with the opposite side walls of the tunnel being closely adjacent to the open ends of the transverse tubular passages 160 for preventing any significant escape of the heat transfer medium H from the respective passages.

To cause the heated medium H to enter the duct 96 (FIG. 2) of the pump 10, there is another pair of squeeze rollers 192 and 194 located at the lower end of the tunnel 190. A pair of conduits 196 are connected into the tunnel so that they communicate with opposite sides of the tunnel. The ends of these conduits 196 are positioned to communicate with the space immediately adjacent to the bite of these squeeze rollers 192 and 194. Thus, the mouths of these conduits are aligned with the position where the passages 160 are being collapsed. Accordingly, as the respective tubular passages 160 are entering into the bite of these squeeze rollers, the passages or compartments 160 become collapsed by the squeezing action, thereby expelling the heated medium H into this pair of conduits 196. These conduits 196 are connected into the pipe end portion 129 (FIG. 2), so as to feed the heated medium H into the duct 96, thereby causing the hot medium H to flow through the passages 94, 72 and 104 into the other duct 106.

In order to remove the hot medium H from the other duct 106, there is another pair of conduits 198 connected into the pipe end portion 130. These conduits 198 communicate with the opposite sides of the lower end of another similar tunnel 200 near a pair of opposed squeeze rollers 202 and 204. The conduits 198 are arranged to communicate with the position where the tubular passages 160 are resuming their normal shape after passing between the squeeze rollers 202 and 204. Thus, the hot medium H, e.g. water, can pass from the conduits 198 into the expanding tubular passages 160 as these passages exit from between the squeeze rollers 202 and 204. The tunnel 200 is similar to the tunnel 190 and serves to retain medium H within the respective individual tubular passages 160.

It is to be understood that the medium H which leaves the conduits 198 and re-enters the passages 160 is cooler than the temperature of the medium H entering the conduits 196, because such medium H has transferred heat energy into the expandable wall means 70 and into the end caps 91 and 101 of the pump 10. Thus, the medium H in these compartments 160 moving upwardly within the tunnel 200 is now lower in temperature than the heated medium H in the compartments 160 moving downwardly within the tunnel 190.

In order to remove the reduced-temperature medium H, for example water, from the tubular passages 160, there is another pair of controllable opposed squeeze rollers 306 and 208 located within the closed end region 210 of the tunnel 200. There is a pair of opposed conduits 212 communicating with the position where the insulated belt 162 enters into the bite between the opposed squeeze rollers 206 and 208. The roller 206 is shifted over close to the roller 208 for squeezing the belt 162, thereby expressing the reduced-temperature medium H from the respective tubular passages 160 as they enter into the nip between these squeeze rollers. The conduits 212 are connected to the heat exchanger 152, so that the reduced-temperature medium H enters this heat exchanger and is cooled by the cold sink 150. The cooled meduim H returns through a line 214 into the belt at a point just above the rollers 206, 208.

After the thermally-actuated wall means 70 has reached the desired temperature level, the insulated belt 162 is reversed in direction and moved toward the heat source 140, as indicated by the arrow L. As this change in belt travel direction occurs, the squeeze rollers 206 and 208 are moved away from each other into their spaced-apart or inactive positions. This spacing of the squeeze rollers 206, 208 is accomplished by moving the roller 206 away from the other roller 208 by a shifting mechanism shown as an hydraulic cylinder 216 with its piston rod 218 mechanically coupled by a yoke to opposite ends of the axle of the roller 206 for moving this axle.

Also, as the change in belt travel direction occurs, the other squeeze rollers 186 and 188 may be moved into their squeezing relationship. This occurs by shifting the roller 188 over to a position closely adjacent to the roller 186. The shift in position is accomplished by a mechanical drive mechanism shown as a cylinder 220 having a piston rod 222 extending therefrom and mechanically coupled to the axle of the roller 188. It is to be understood that a yoke is connected to the other end of each axle of the squeeze rollers 188 and 206, so that their positions remain parallel with their companion rollers 186 and 188, respectively.

As the insulated belt 162 travels in the direction L, the cooled medium H contained within the tubular passages 160 is squeezed out or expressed from these compartments 160 as the belt enters the nip region between the squeeze rollers 202 and 204. This cooled medium passes through the conduits 198 and enters the duct 106 to pass through the ports 105, and thence through passages 104, 72 and 94, and then through ports 95 in the other duct 96. In this way, the expansion/contraction cylindrical wall means 70 is cooled and its contracts. The cooled medium H in passing through the passages 104, 72 and 94 becomes warmed up by transfer of heat into the medium H, and this warmed medium passes out from the duct 96 into the conduits 196 then entering the tubular passages 160 as they exit from between the bite of the squeeze rollers 192 and 194. The warmed medium H is thereby carried by compartments 160 in the insulated belt moving up through the tunnel 190 to enter into the nip between the now-squeezing rollers 186 and 188. Thus, the warmed medium is squeezed into the lines 182, leading to the heat exchanger 142. In this way, the medium becomes re-heated by absorbing additional thermal energy from the wasted heat source 140.

After several cycles of back and forth motion of the flexible insulated belt 162, the temperature of the medium H contained within each open-end transverse tubular passage 160 becomes a few degrees different from that of the medium H in the tubular passage on either side. The tubular passages 160, as seen looking along the length of the belt 162 within the tunnel 200 in a direction toward the cold sink 150, each contain the medium H of a progressively colder temperature. Conversely, the tubular passages 160 as seen looking along the length of the belt 162 within a tunnel 190 in a direction toward the hot source 140, each contains such medium of a progressively hotter temperature. This progression in temperature of the medium within the respective tubular passages 160 is approximately uniform from the hot end of the flexible insulated belt 162 to its cold end.

Therefore, as the flexible insulated belt 162 is moved in the direction R, increments of the heated medium H of progressively higher temperature are passed in heat exchange relationship with respect to the expansion/contraction wall means 70. As a result of this advantageous relationship, the aluminum walled structure 70 is caused to expand by heat exchange with the medium H passing therethrough at a temperature which is at only a small differential, i.e., at only a few degress, warmer at each moment than the temperature of the wall means 70 itself at that moment in time. In effect, a heat exchange is being accomplished under conditions which approach reversibility in the thermodynamic sense.

Similarly, when the flexible insulated belt 162 is being moved in the direction L, the wall means 70 is being cooled by successive increments of the medium H passing in heat exchange relationship therewith at a temperature which is at only a small differential, i.e. at only a few degrees cooler at each instant than the temperature of the wall means 70 at that moment in time. Again, the heat exchange is occurring under conditions which approach reversibility in the thermodynamic sense. As a result of this operation, the maximum theoretical possible efficiency, i.e. the Carnot limit, is being approached with respect to the heat energy contained within the liquid heat exchange medium H in each of the individual compartments 160 within the insulated belt 162.

Figure 7:
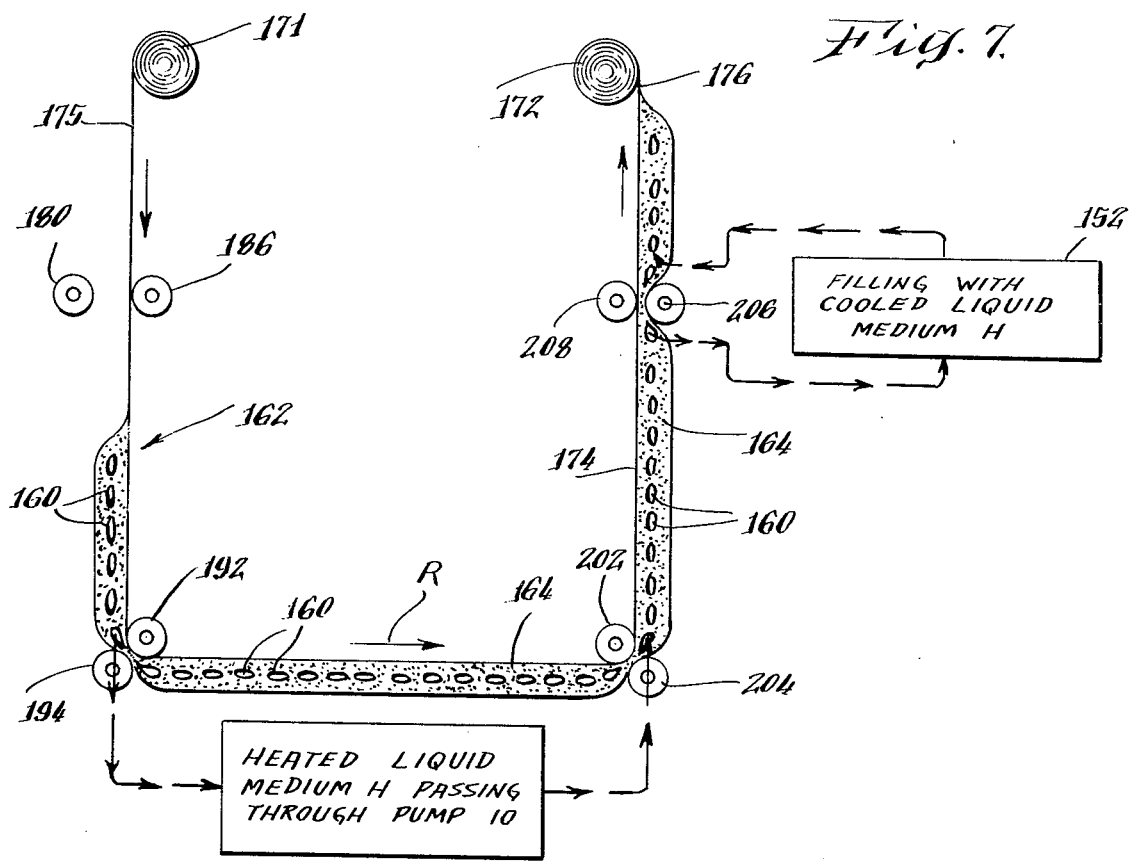

In order to explain the various modes of operation, attention is invited to FIGS. 5 through 7. As shown in FIG. 5, the belt 162 is moving in direction L. As it passes between the now active squeeze rollers 186 and 188 the individual compartments 160 at the hot end of the belt are being filled with the freshly heated medium H which circulated through the heat exchanger 142. Depending upon the temperature of the heat exchanger 142 and upon the amount of load being driven by the pump 10, i.e. depending upon the power output desired, a greater or lesser number of the compartments 160 at the hot end of the belt may be filled with the freshly heated liquid medium H. In order to control the number of compartments 160 which are supplied with the freshly heated medium, a greater or lesser length of the belt is passed between the squeeze rollers 186 and 188. This control may be accomplished by control of the wind-up rollers 171 and 172 and/or by control of the length of time that the rollers 186 and 188 are positioned in their active squeezing relationship. For example, one foot or a few feet or many feet of the belt 162 may be supplied with the heated medium H, depending upon the desired operating conditions.

After the hot end of the belt 162 has been filled with the freshly heated medium H, the belt 162 is cycled back and forth with respect to the pump 10. FIG. 6 shows the heat transfer belt being cycled back and forth. It is to be noted that both pairs of squeeze rollers 186, 188 and 206, 208 are now in their inactive spaced-apart positions. (The other two pairs of squeeze rollers 192, 194 and 202, 204 are always in thier squeezing relationship on the belt 162.) Thus, no additional heated or cooled heat transfer medium H is now being supplied to the belt 162 during this cycling back and forth. Also, it is to be noted that this heated medium was only supplied to the hot end portion of the belt 162 as discussed above.

As the belt is moved back and forth, as shown in FIG. 6, the heated medium from the hot end of the belt is passed through the pump 10, and then cooler medium from the cold end of the belt is passed back through the pump, in the reverse direction, and so forth. Thus, the expansion/contraction wall means 70 is alternately heated and cooled. Moreover, there is a temperature gradient along the length of the belt with the medium in compartments 160 toward the hot end being progressively warmer while the medium in the compartments toward the cold end is progressively cooler. Accordingly, the wall means 70 is being progressively heated and cooled by the medium H which at each instant is at only a small temperature differential from the wall means 70, giving the advantages discussed above. The heat transfer belt may be cycled back and forth, as shown in FIG. 6, only once or a few times or several times, depending upon the desired operating conditions.

During this cycling back and forth of the belt 162, as shown in FIG. 6, the temperature of the medium in the compartments 160 along the length of the belt gradually tends to become equalized, that is, to reach a median temperature. After one or more cycles, as shown in FIG. 6, then cooled medium is supplied to the cold end of the belt, as shown in FIG. 7, by passing this end of the belt upwardly between the now active squeeze rollers 206 and 208. As discussed above in connection with supply of the freshly heated medium, a greater or lesser length of the cold end of the belt is passed between the active squeeze rollers 206 and 208 depending upon the number of compartments 160 which are desired to be filled with the freshly cooled medium.

Now that the cold end of the belt has been supplied with the cooled medium, the belt is again cycled back and forth as shown in FIG. 6 with both pairs of squeeze rollers 186, 188 and 206, 208 in their inactive positions. The heat transfer belt may be cycled back and forth as shown in FIG. 6 only once or a few times or several times, depending upon the desired operating conditions.

After one or more cycles of back and forth motion, as shown in FIG. 6, the temperature of the medium in the compartments along the length of the belt again tends to become equalized at a lower median temperature than occurred when the hot end of the belt 162 was charged with freshly heated medium H.

After one or more cycles, as shown in FIG. 6, then heated medium is again supplied to the hot end of the belt by passing this end of the belt upwardly, as shown in FIG. 5, between the now active pair of squeeze rollers 186, 188. Then the whole sequence of operation is repeated, as shown in FIGS. 5 through 7, and so forth, for producing the desired pumping action of the thermally actuated pump 10.

Another mode of operation is to charge the hot end of the belt 162 with the freshly heated liquid medium H, as shown in FIG. 5, and then immediately thereafter to charge the cold end of the belt with freshly cooled liquid medium H, as shown in FIG. 7. Then, the belt is cycled back and forth one or more times, as shown in FIG. 6.

After one or more cycles of back and forth motion, both ends of the belt are again charged with freshly heated and freshly cooled fluid medium H one immediately after the other, as shown in FIGS. 5 and 7, respectively. Then the belt is again cycled back and forth, as shown is FIG. 6, and so forth.

It is to be noted that none of the compressible material 164 is wound upon either reel 171 or 172; only the leaders 175 and 176 are wound onto these reels.

The reason for using hydraulically-actuatable motors 166 and 168 for driving the reels 171 and 172 is that they can be energized directly from the accumulator 38 by supplying pressurized liquid from the accumulator to these two motors 166 and 168, and by returning the used liquid into the reservoir 24. Suitable piping connections and valves (not shown) are provided to supply the pressurized liquid 22 from the accumulator to the respective reel motors 166 and 168, and to the various hydraulic actuators 216 and 220.

Once the accumulator 38 has been initially charged, the system of FIG. 4 is capable of being hydraulically self-started. Thus, it can be used in remote locations, etc.

In order to keep the passages 72 in the wall means 70 filled with the medium H at all times, the very extreme end portions of the compressible material 164 are not pulled through the squeeze rollers 192, 194 nor 202, 204.

Figure 8:
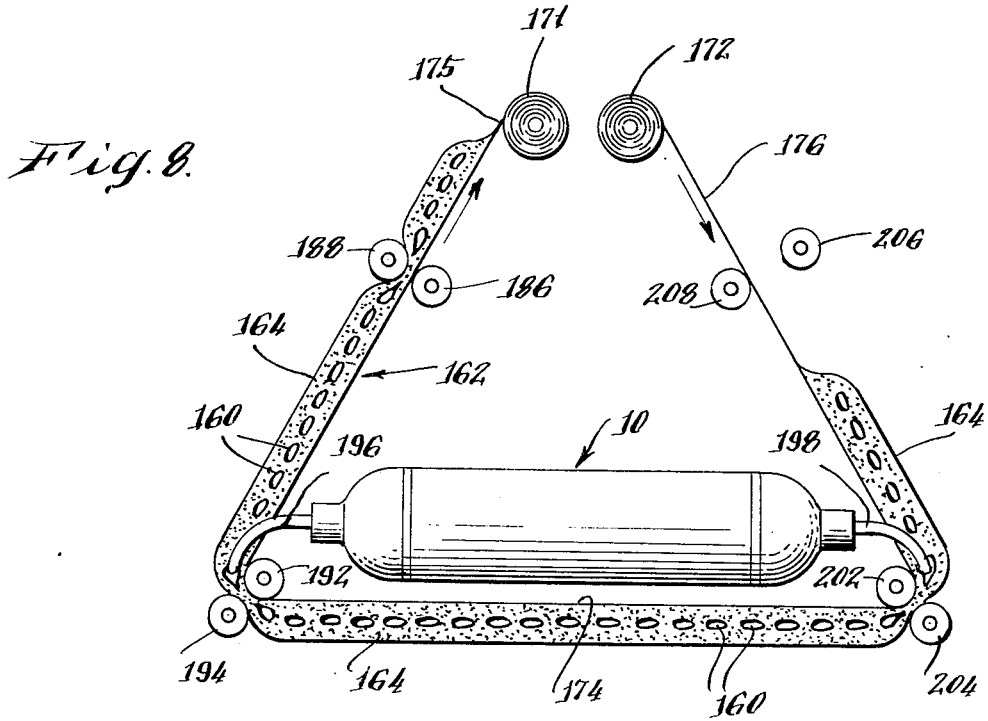
FIG. 8 is another diagram of the system of FIG. 4 showing a generally triangular overall arrangement.

FIG. 8 shows an alternative arrangement of the heat transfer belt 162 in which the wind-up reels 171 and 172 are positioned relatively close together. The result is that the belt 162 together with its leaders 175 and 176 defines a generally isosceles triangular configuration, whereas the belt together with its leaders, as shown in FIGS. 4 through 7, defines a generally rectangular U-shape. The triangular belt layout arrangement shown in FIG. 8 has the advantage of being more compact overall as compared with the layout shown in FIGS. 4 through 7.

Also, in FIG. 8 the expansion/contraction pump 10 is shown positioned above the portion of the belt running between the pairs of squeeze rollers 192, 194 and 202, 204. In effect, the pump 10 is located within the isosceles triangular belt layout, which further compacts the overall system.

Figure 9:
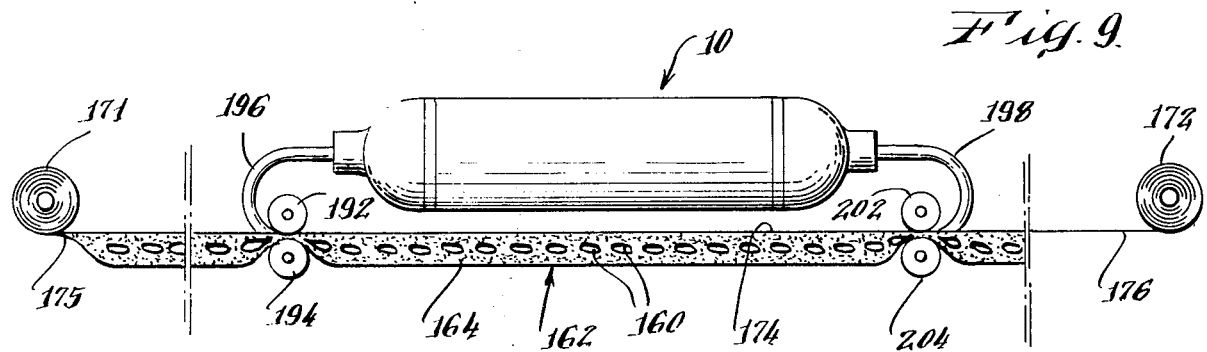
FIG. 9 is a further diagram of the system of FIG. 4 showing a straight-line overall arrangement.

FIG. 9 shows a straight path layout of the belt 162, in which the expansion/contraction pump 10 is positioned above the belt. In FIG. 9, portions of the belt 162 are broken away to reduce the horizontal extent of the drawing.

It is to be understood that in the arrangements shown in either FIG. 8 or FIG. 9, the expansion/contraction pump 10 could be positioned below the portion of the belt extending between the pairs of squeeze rollers 192, 194 and 202, 204.

In another mode of passing the heat transfer medium H through the pump 10, the straight-line belt 162 in FIG. 9 is replaced by a long column of the liquid medium H contained within an insulated tube with a floating piston at each end of the column. This insulated tube would form a long straight-line extension of the conduits 196 and 198 toward the left and right in FIG. 9. * One end of this column comprises the heated medium and the other end comprises the cooled medium. By moving these floating pistons simultaneously back and forth, the column of the heated and cooled medium is passed back and forth through the pump 10 for cyclically heating and cooling it. Periodically, the liquid medium at opposite end of the column is freshly heated and freshly cooled, respectively. The floating pistons may be driven back and forth by means of compressed air or piston rods.

*Alternatively, the liquid column could be U- or tri-angular-shaped with two upright legs similar to the path of the belt in FIGS. 5–7, or in FIG. 8.

Figure 10:
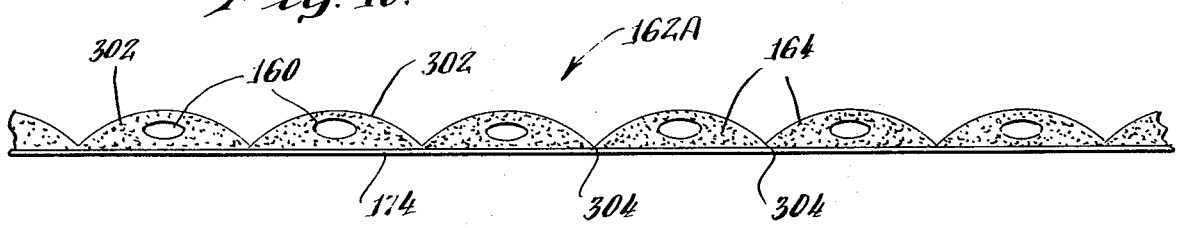
FIG. 10 is an enlarged elevational view of a modified embodiment of the flexible heat transfer conveyor belt.

In FIG. 10 is shown an enlarged view of a flexible heat transfer belt 162A having a backing strip 174, such as described above. Each of the separate transverse tubular passages 160 is located within an individual rounded pillow-shaped mass 302 of foamed polyurethane material 164. The contour of these adjacent rounded masses 302 attached to the backing strip 174 is generally cycloidal, as seen in FIG. 10. The regions 304 where the cycloidal cusps are located are very flexible as determined by the backing strip 174. Moreover, the belt 162A can be flexed at the spaced regions 304 without distorting or compressing the pillow-shaped masses 302.

Figure 11:
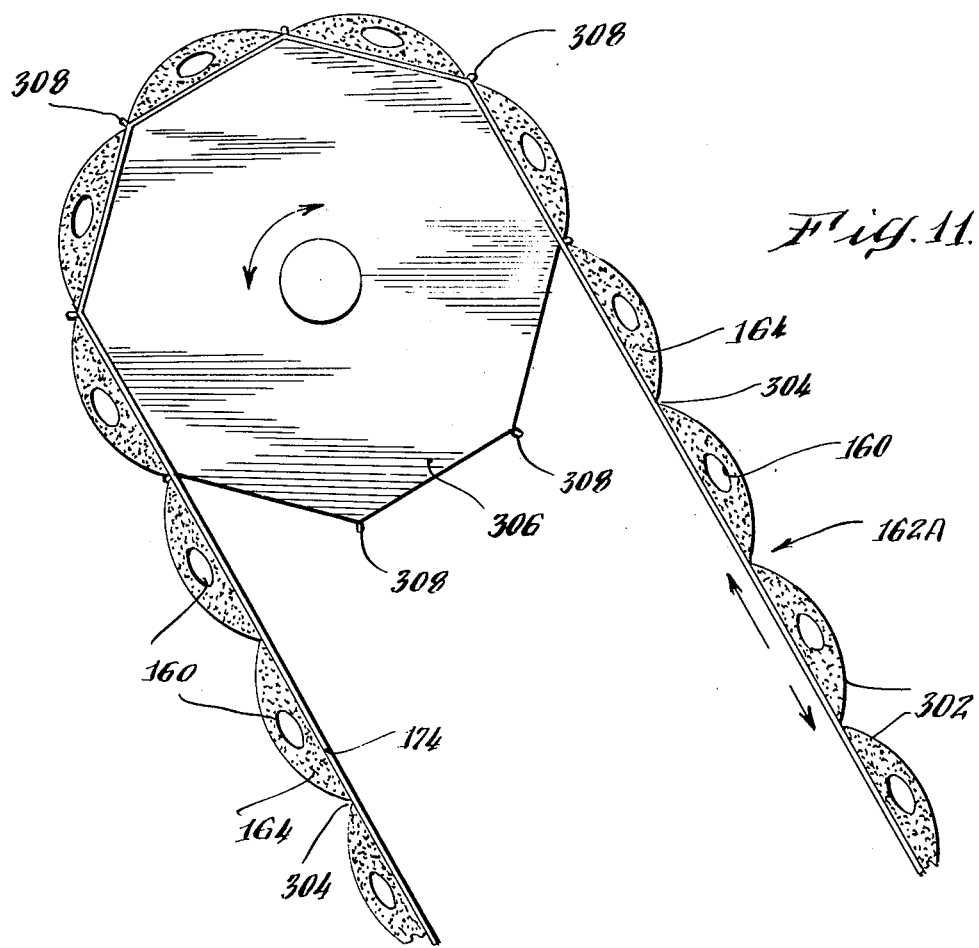
FIG. 11 shows the belt of FIG. 10 passing around a polygon-shaped roller having spaced sprocket teeth.

Thus, as shown in FIG. 11, the flexible belt 162A can advantageously be passed around a pulley roller 306 having a regular polygonal contour. In order to position and register the belt 162A in positive relationship with respect to the pulley 306, there are registration means 308, for example, such as sprocket teeth on the pulley located at the vertices of its polygonal contour. These sprocket teeth 308 engage in sprocket holes in the backing strip 174 located at the flexible regions 304 between the respective pillow-shaped masses 302.

Figure 12:
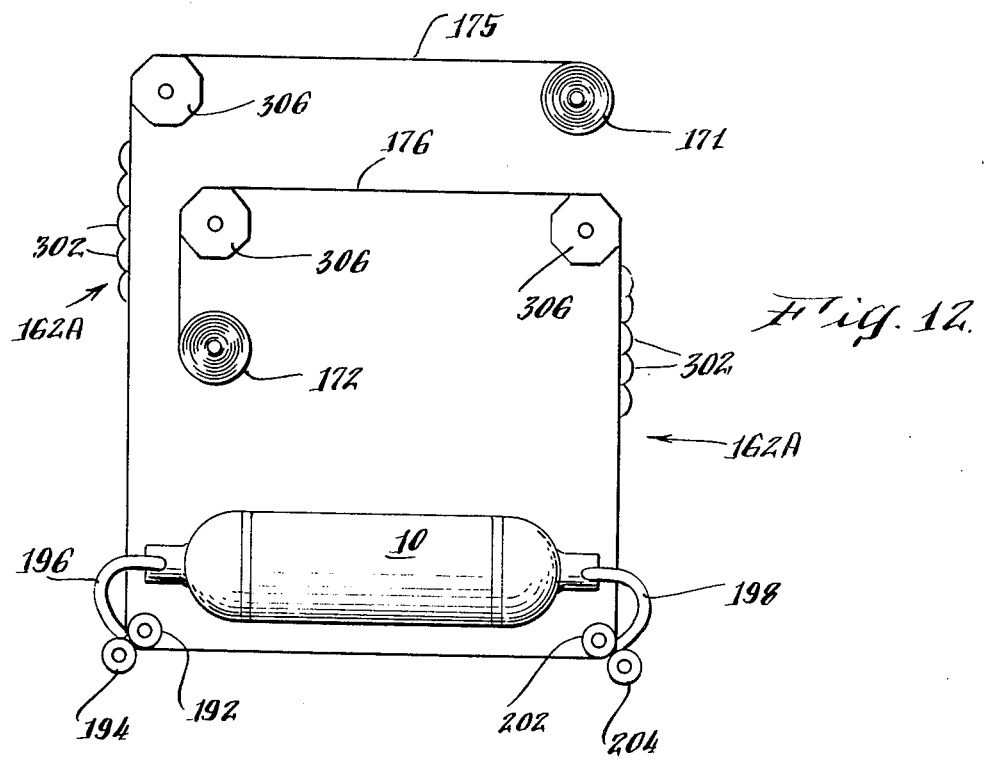
FIG. 12 is a diagram showing a further compact overall arrangement of the system of FIG. 4 obtained by utilizing the type of belt shown in FIGS. 10 and 11.

FIG. 12 shows a compact arrangement of the system of FIG. 4 which is enabled to be made by utilizing the flexible belt 162A passed around a sequence of polygonal pulley rollers 306. One end of the belt 162A is bent into a series of straight segments defining a rectangular spiral path which spirals inwardly with its leader wound onto the wind-up roller 171. The other end of the belt 162A is also bent into a series of straight segments defining a rectangular U-shaped path encircling the rectangular spiral path of the first end. The leader 176 is wound onto the wind-up reel 172.

Figure 13:
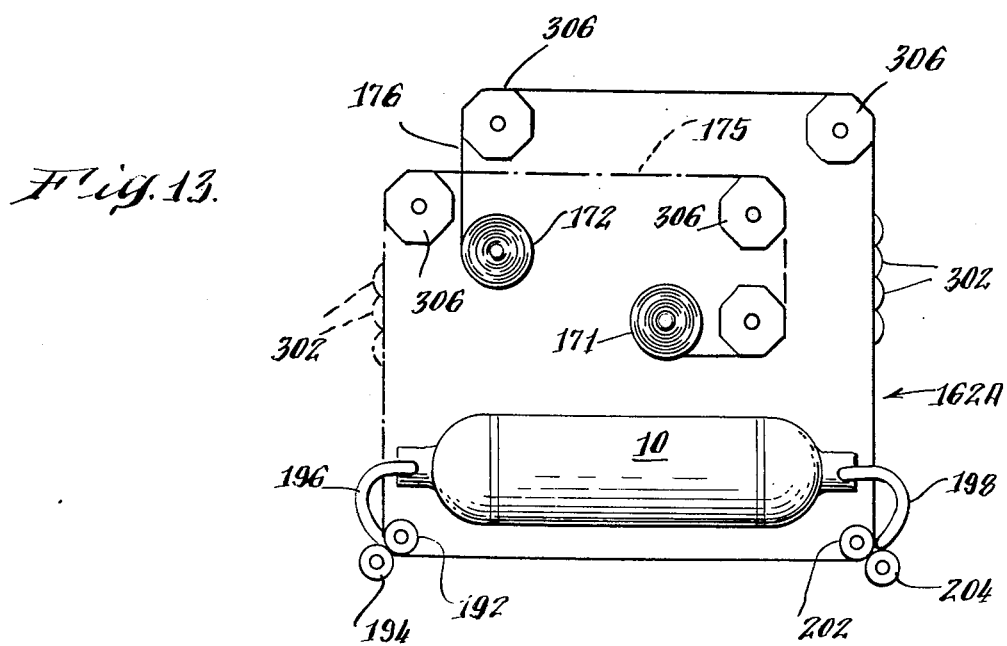
FIG. 13 is a diagram showing another compact overall arrangement of the system of FIG. 4 incorporating the type of belt shown in FIGS. 10 and 11.

In FIG. 13 is shown another compact layout of the system of FIG. 4 employing the flexible belt 162A. Each end of the belt 162A is bent into a rectangular spiral path similar to the one end of the belt in FIG. 12, and the two spiral paths are positioned in spaced parallel planes as indicated by the dash-and-dotted line drawing of one belt.

From the foregoing, it will be understood that the method and apparatus of the present invention described above are well suited to provide the advantages set forth, and since many possible embodiments may be made of the various features of this invention and as the method and apparatus herein described may be varied in the various steps and parts, all without departing from the scope of the invention, it is to be understood that all matter hereinbefore set forth, or shown in the accompanying drawings, is to be interpreted as illustrative and that in certain instances, some of the features of the invention may be used without corresponding use of the other features, all without departing from the scope of the invention as defined in the following claims.

I claim:

1. The method for recovering waste industrial or solar heat energy for performing mechanical work comprising the steps of:

defining first and second pump chambers, forming between said chambers a thermally expandable walled structure from strong material having good heat conductivity and a relatively low specific heat and which expands when heated in the temperature range of operation, filling both said chambers with incompressible fluid, heating a fluid heat transfer medium by said heat energy, passing the heat medium in heat exchange relationship with said walled structure for heating and expanding said walled structure in push-pull relationship between said chambers for increasing the volume of said first chamber while simultaneously decreasing the volume of said second chamber, thereby displacing said incompressible fluid into said first chamber and out of said second chamber, passing a fluid heat transfer medium in heat transfer relationship with said cold sink for cooling the medium, passing the cooled medium in heat exchange relationship with said walled structure for cooling and contracting said walled structure in pull-push relationship between said chambers for decreasing the volume of said first chamber while simultaneously increasing the volume of said second chamber, thereby displacing said incompressible fluid out of said first chamber and into said second chamber, repeating said steps for cyclically displacing the incompressible fluid into and out of said first and second chambers, and utililzing the cyclic displacement of said incompressible fluid for pumping a liquid for performing useful mechanical work.

2. The method of recovering waste industrial or solar heat energy for performing useful mechanical work, as claimed in claim 1, in which:

said liquid is pumped into an accumulator under pressure, and the pressurized liquid from the accumulator is utilized for performing the useful mechanical work.

3. The method of recovering waste industrial or solar heat energy for performing useful mechanical work, as claimed in claim 1, in which:

the fluid heat transfer medium is separated into a plurality of individual volumes which are thermally isolated one from another, a number of said individual volumes of the medium are heated by said heat energy, a number of said individual volumes of the medium are cooled by the cold sink and the volumes of heated and cooled medium are alternately passed in heat exchange relationship with said walled structure.

4. The method of recovering waste industrial or solar heat energy for performing useful mechanical work, as claimed in claim 3, in which:

said individual volumes of the fluid heat transfer medium are positioned in separate passages in a squeezable thermally insulating belt.

5. The method of recovering waste industrial or solar heat energy for performing useful mechanical work, as claimed in claim 1, in which:

said incompressible fluid is a soft elastomer.

6. The method of recovering waste industrial or solar heat energy for performing useful mechanical work, as claimed in claim 1, in which:

said incompressible fluid is a de-gassed liquid, and including the step of isolating said de-gassed liquid from the liquid being pumped.

7. The method for recovering waste industrial or solar heat energy in a form useful for performing mechanical work comprising the steps of:

providing a reservoir for holding a liquid to be pumped, providing an accumulator for holding said liquid under pressure, defining a pump chamber, forming a thermally expandable cylindrical wall of said chamber from strong material having good heat conductivity and a relatively low specific heat and which expands when heated in the temperature range of operation, filling said chamber with incompressible fluid, providing displacement communication between said liquid and said incompressible fluid through a first check valve for permitting said first liquid to flow from said reservoir toward said pumping chamber while preventing reverse flow back into said reservoir, providing displacement communication between said incompressible fluid and said accumulator through a second check valve for permitting said first liquid to be pumped through said second check valve into said accumulator while preventing reverse flow back from said accumulator, providing a cold sink, utilizing said heat energy to heat a fluid heat transfer medium, passing said heat transfer medium in heat exchange relationship with said cylindrical wall for heating it, thereby to expand said cylindrical wall for changing the volume of said pump chamber in one sense for displacing said incompressible fluid in one direction, passing said heat transfer medium in heat exchange relationship with said cold sink for cooling said medium, passing the cooled medium in heat exchange relationship with said cylindrical wall for cooling it, thereby to contact said cylindrical wall for changing the volume of said chamber in the opposite sense for displacing said incompressible fluid in the opposite direction, utilizing said displacements of said incompressible fluid for pumping said liquid for withdrawing said liquid from said reservoir and for pumping said liquid into said accumulator under pressure, and utilizing the pressurized liquid in said accumulator as stored energy useful for performing mechanical work.

8. The method of recovering waste industrial or solar heat energy, as claimed in claim 7, in which:
said heat transfer medium is divided into a plurality of individual volumes which are thermally insulated one from another,
a number of said individual volumes of the medium are sequentially heated by said heat energy source, and
said individual volumes of the heated medium are passed in sequence in heat exchange relationship with said cylindrical wall.

9. The method of recovering waste industrial or solar heat energy, as claimed in claim 8, in which:
said individual volumes of heat transfer medium are carried in individual passages in a flexible insulated web,
including the step of squeezing said passages one after another to express the medium from said passages for causing said volumes of the medium to pass in heat exchange relationship with said cylindrical wall, and
including the further step of allowing collapsed passages to resume their normal configuration for receiving said individual volumes of the medium therein after passing in heat exchange relationship with the cyclindrical wall.

10. The method of recovering waste industrial or solar heat energy, as claimed in claim 7, in which:
said incompressible fluid is de-gassed liquid, and
displacement communication between said de-gassed liquid and the liquid being pumped is provided through movable separator means for isolating the de-gassed liquid from the liquid being pumped.

11. The method of recovering waste industrial or solar heat energy, as claimed in claim 7, in which:
said incompressible fluid is a soft elastomer.

12. A thermally-actuated expansion/contraction pump comprising:
thermally responsive expansion/contraction wall means formed from strong material of good heat conductivity which expands when heated surrounding an inner pumping chamber,
a rigid housing surrounding said expansion/contraction wall means defining an outer pumping chamber located between said housing and said expansion/contraction wall means,
a first duct communicating with said inner pumping chamber,
a second duct communicating with said outer pumping chamber, and
heat exchange means including a plurality of passages in heat exchange relationship with said expansion/contraction wall means for passing heated and cooled liquid in heat exchange relationship with said expansion/contraction wall means.

13. A thermally-actuated expansion/contraction pump, as claimed in claim 12, in which:
said expansion/contraction wall means is generally cylindrical in configuration,
said heat exchange means includes a plurality of passages extending in an axial direction through said cylindrical expansion/contraction wall means, and
inner and outer thermal insulaton means adjacent to the inner and outer surfaces of said cylindrical expansion/contraction wall means for minimizing heat loss therefrom.

14. A thermally-actuated expansion/contraction pump, as claimed in claim 13, in which:
expansion of said cylindrical wall means decreases the volume of said outer pumping chamber and simultaneously increases the volume of said inner pumping chamber, and vice versa.

15. A thermally-actuated expansion/contraction pump, as claimed in claim 13, in which:
said expansion/contraction cylindrical wall means is formed of aluminum material and has an inner wall and an outer wall spaced therefrom and concentric therewith and has a plurality of radially extending webs bridging across between said inner and outer wall defining said plurality of passages between said inner and outer walls.

16. A thermally-actuated expansion/contraction pump, as claimed in claim 15, in which:
a pair of end caps are included, an end cap being attached to each end of said cylindrical wall means,
each end cap has passages therein communicating with the passages in said cylindrical wall means,
an inlet-outlet duct is attached to one of said end caps and communicating with the passages in said one end cup for passing a fluid heat transfer medium therethrough, and
another inlet-outlet duct is associated with the other end cap in sliding relationship therewith and communicating with the passages in said other end cap for passing a fluid heat transfer medium therethrough, said sliding relationship permitting the expansion and contraction of said cylindrical wall means to occur.

17. A thermally-actuated expansion/contraction pump, as claimed in claim 16, in which:
a pair or flexible boots are included, said boots each being connected between said other end cap and its associated inlet-outlet duct for sealing the inner and outer pumping chambers in spite of the sliding relationship between said other end cap and said inlet-outlet duct.

18. A thermally-actuated expansion/contraction pump, as claimed in claim 12, in which:
thermal insulation means is positioned adjacent to the inside and adjacent to the outside of said cylindrical wall means for thermally insulating said wall means from said inner and outer pumping chambers.

19. A thermally-actuated expansion/contraction pump, as claimed in claim 18, in which:
said thermal insulation means is a soft elastomeric material filling said inner and outer pumping chambers for being displaced by the expansion and contraction of said wall means for producing a pumping action.

20. A thermally-actuated expansion/contraction pump comprising:
an inner hollow cylindrical member,
barrier means plugging said member at two spaced locations for forming a pair of inlet-outlet ducts in the opposite ends of said hollow member,
cylindrical wall means of thermally expandable material surrounding said hollow member,
a pair of end caps encircling said ducts and secured to opposite ends of said cylindrical wall means,
said cylindrical wall means and said end caps defining an inner pumping chamber,
one of said caps being secured to one of said inlet-outlet ducts.

the other end cap engaging in sliding relationship with the other inlet-outlet duct, said cylindrical wall means having a plurality of passages extending axially therethrough and said end caps having passages therein providing communication between the passages in said cylindrical wall means and the respective inlet-outlet ducts for enabling a fluid heat transfer medium to be circulated and then back-circulated through the passages in said cylindrical wall means, a rigid housing surrounding said cylindrical wall means and said end caps and being secured to both of said inlet-outlet ducts, said rigid housing defining an outer pumping chamber located therein and which extends around said cylindrical wall means and said end caps, insulation material positioned around said housing, and a pair of conduits extending from the exterior of said pump into said inner and outer pumping chambers.

21. A thermally-actuated expansion/contraction pump, as claimed in claim 20, in which:
said cylindrical wall means is formed by an extrusion of aluminum.

22. A thermally-actuated expansion/contraction pump, as claimed in claim 20, in which:
inner and outer flexible boots are connected between said other end cap and said other inlet-outlet duct, said inner and outer boots sealing said inner and outer pumping chambers, respectively, while permitting said sliding relationship between said other end cap and said other inlet-outlet duct.

23. A thermally-actuated expansion/contraction pump, as claimed in claim 20, in which:
insulation means is positioned adjacent to the interior and exterior of said cylindrical wall means.

24. A thermally-actuated expansion/contraction pump, as claimed in claim 23, in which:
said insulation means in a soft elastomeric material filling said inner and outer pumping chambers,
said soft elastomeric material being displaceable in said chambers by expansion and contraction of said cylindrical wall means for providing a pumping action.

25. A system for recovering industrial or solar heat energy comprising:
a first heat exchanger for absorbing the heat energy to be recovered adapted to have a fluid heat exchange medium passed therethrough,
a second heat exchanger for rejecting unused heat energy into a cold sink adapted to have the fluid heat exchange medium passed therethrough,
a belt of compressible thermally insulating material having a plurality of compartments therein for carrying a volume of said medium in each compartment thermally insulated from the volumes thereof in other compartments,
first, second, third and fourth pairs of squeeze rollers each pair being arranged for the belt to pass therebetween for squeezing and releasing sequential portions of the compressible insulating material for squeezing and releasing sequences of said compartments, said first pair of squeeze rollers being operatively associated with said first heat exchanger for causing the volumes of the fluid heat exchange medium to be expressed from compartments of the belt to pass through said first heat exchanger and to re-enter the released compartments as a freshly heated medium,
first control means for moving said first pair of squeeze rollers apart into an inactive position,
said second pair of squeeze rollers being operatively associated with said second heat exchanger for causing volumes of the medium to be expressed from compartments of the belt to pass through said second heat exchanger and to re-enter the released compartments as a freshly cooled medium,
a pump having thermally actuatable expansion/contraction wall means positioned in push-pull relationship between a pair of pumping chambers for changing the volumes of said chambers in opposite senses upon expansion and contraction of said wall means,
said third and fourth pair of squeeze rollers being operatively associated with said pump for causing volumes of the medium to be expressed from compartments of the pump to pass in heat exchange relationship with said expansion/contraction wall means and to re-enter the released compartments,
second control means for moving said second pair of squeeze rollers apart into an inactive position, and
means for moving said belt back and forth between said four pairs of squeeze rollers.

26. A system for recovering industrial or solar heat energy, as claimed in claim 25, in which:
said compartments are tubular passages extending transversely through said belt having their ends open at opposite edges of the belt.

27. A system for recovering industrial or solar heat energy, as claimed in claim 26, in which:
a channel member extends adjacent to opposite ends of said tubular passages for retaining the fluid heat transfer medium in said tubular passages except at the location of said pairs of squeeze rollers.

28. A system for recovering industrial or solar heat energy, as claimed in claim 25, in which:
said belt includes backing strip having compressible insulating material thereon,
said backing strip extending beyond opposite ends of said insulation material forming leaders at opposite ends of the belt, and
said means for moving said belt includes a pair of wind-up reels for winding the respective leaders thereon for pulling the belt back and forth.

29. A system for recovering industrial or solar heat energy, as claimed in claim 28, in which:
said compressible insulation material on said belt is separated into a plurality of pillow-shaped masses, each of said compartments being located in one of said masses.

30. A system for recovering industrial or solar heat energy, as claimed in claim 29, in which:
the contour of a sequence of said pillow-shaped masses is generally cycloidal in appearance.

* * * * *